United States Patent [19]
Ueda

[11] Patent Number: 5,485,202
[45] Date of Patent: Jan. 16, 1996

[54] WHITE BALANCE ADJUSTING APPARATUS

[75] Inventor: Osamu Ueda, Kawasaki, Japan

[73] Assignee: Canon Kabushiki Kaisha, Tokyo, Japan

[21] Appl. No.: 203,820

[22] Filed: Mar. 1, 1994

[30] Foreign Application Priority Data

Mar. 4, 1993 [JP] Japan .................................. 5-043667

[51] Int. Cl.$^6$ ................................................. H04N 5/225
[52] U.S. Cl. ............................................. 348/223; 348/228
[58] Field of Search ................................. 348/223, 228, 348/222

[56] References Cited

U.S. PATENT DOCUMENTS 5,099,316  3/1992  Ogawa ..................................... 348/228
5,223,921  6/1993  Haruki et al. ......................... 348/223 X Primary Examiner—Wendy R. Greening
Attorney, Agent, or Firm—Robin, Blecker, Daley & Driscoll

[57] ABSTRACT

In a white balance adjusting apparatus, information about picture portions whose color components cannot be detected under normal conditions, e.g., picture portions whose brightness level is excessively high, or excessively low, are suppressed from white balance controlling data, so that data required for the white balance control can be correctly obtained without using small windows which a frame of picture is subdivided into. For this purpose, signals of predetermined window portions within one frame of picture are integrated by integration circuits, while weighting the signals by multiplication factor generating means based on brightness level, and then a white balance control is carried out by using an integrated value.

16 Claims, 4 Drawing Sheets

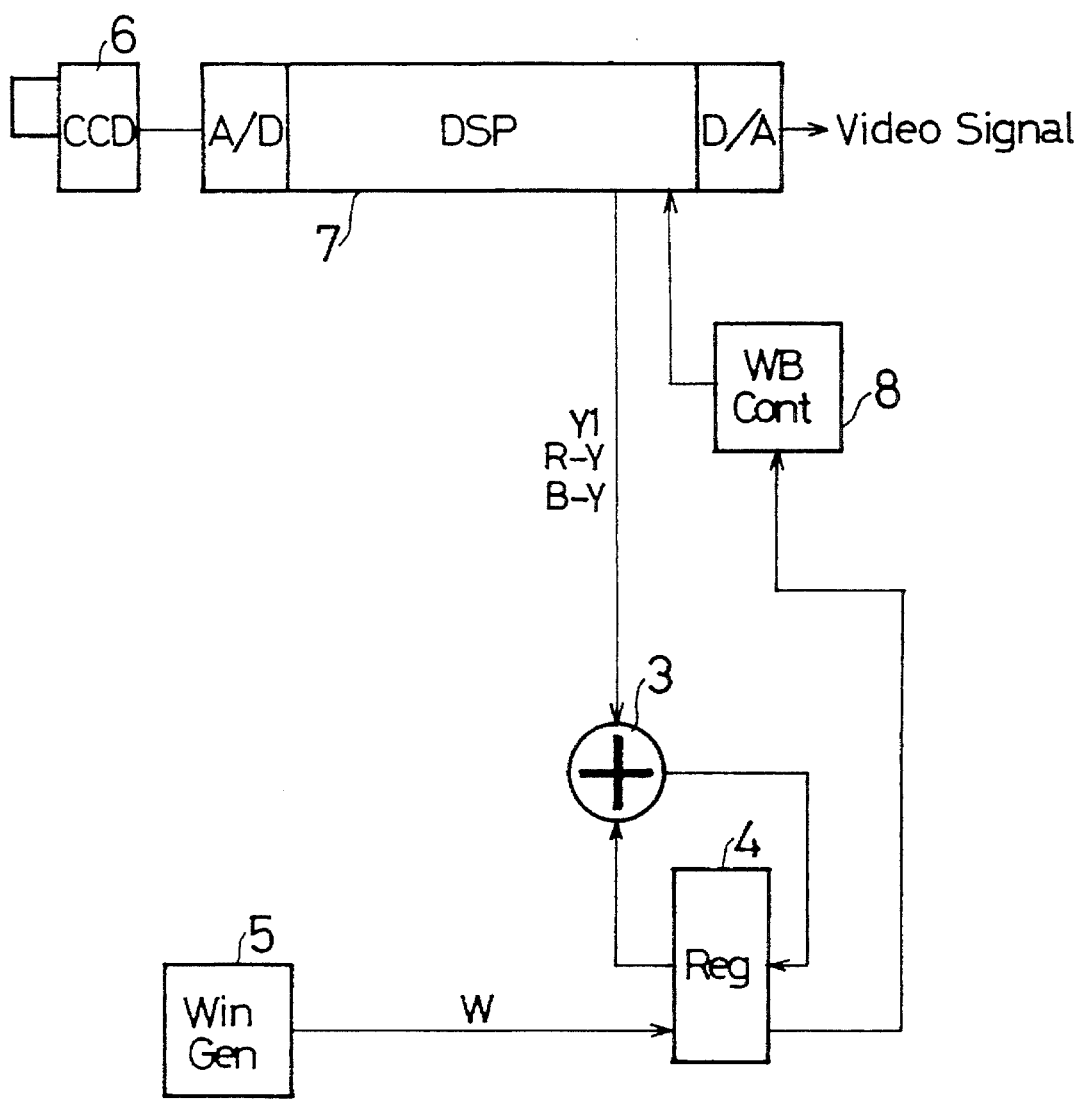

WHITE BALANCE ADJUSTING APPARATUS

BACKGROUND OF THE INVENTION

1. Field of the Invention

The present invention generally relates to a white balancing adjusting apparatus. More specifically, the present invention is directed to a white balance control used in a camera and the like.

2. Description of the Prior Art

In most of recently available video cameras, the data about the brightness (Y1) signal and the color difference (R-Y and B-Y) signals required to control the white balance are detected from a frame of picture. In this case, these conventional video cameras are arranged in order that signal detecting precision is increased by subdividing a frame of picture into a plurality of windows, and by integrating such brightness and color difference signal data with respect to each of the plurality of windows. That is, the white balance control is correctly performed in such a manner that a window grid having a preselected dimension is preset to subdivide a frame of picture, and data about brightness and color difference information derived from the respective windows are integrated so as to detect improper portions which are not suitable to the white balance control, for instance, a window whose brightness is too high and/or too low to detect correct color component, and thereafter the data derived from these improper windows are eliminated from the entire data for the correct white balance control.

Referring now to FIG. 1, an example of an arrangement of the above-described conventional white balance control system will be explained. In the white balance control system of FIG. 1, reference numeral 3, shows an integration adder, reference numeral 4 denotes an integration register (simply, referred to "Reg"), and reference numeral 5 represents a window generating circuit (simply, referred to "Win Gen") for generating a signal by which a frame of picture is subdivided into plural windows and positions of these windows are designated. Further, reference numeral 6 denotes an image pickup device (CCD), reference numeral 7 shows a digital signal processing circuit (DSP) having A/D converters in input/output stages; and reference numeral 8 is a white balance control circuit (WB Cont). It should be understood that although only a single circuit arrangement of the integration circuits 3 and 4 is shown for the sake of simple illustration, three circuit arrangements for the brightness(Y1) signal and the color difference (R-Y and B-Y) signals are actually employed. An image of an object is passed through an image pickup optical system (not shown in detail) and then focused onto the image pickup device 6. An analog image signal obtained from the image pickup device 6 is processed by the analog-to-digital (A/D) converter, and thereafter is processed in the digital signal processing circuit 7. Then, the digital processed image signal is D/A-converted to be outputted as a video signal. On the other hand, the brightness (Y1) signal and the two color difference (R-Y and B-Y) signals are derived as white balance controlling data during the data process from the digital signal processing circuit 7. These three signals are inputted into the integration circuit constructed of the adder 3 and the register 4, so that these white data are integrated. When this integration process is carried out, the window signal "W" which has been generated from the window generating circuit 5 and which subdivides the picture into a plurality of windows will determine which window's data are integrated. The integration circuits 3 and 4 sequentially acquire the data of a portion of the picture in response to the window signal "W", and then the acquired data are transferred to the white balance control circuit 8. Upon completion of the data acquisition performed in this manner with respect to one picture, the white balance control circuit 8 eliminates the color difference data about the subdivided picture portion which is not suitable for the white balance control (for instance, window portion "S" as shown in FIG. 2(b)) due to excessive brightness thereof among the acquired data based on the integrated data of the brightness data. Then, the white balance control circuit 8 uses only the effective data, which have not been eliminated, in order that the white balance control in the digital signal processing circuit 7 is carried out.

However, the above-described prior art has following drawbacks. That is, when the picture portions (windows) not suitable for the white balance control, such as too high brightness picture portions, are removed from the entire picture, if the size of the window is excessively large, then a large area of such improper picture portions will be eliminated. As a result, the correct detection of the white balance controlling data cannot be carried out. Conversely, when the size of the window is excessively small, a lengthy time period is required to acquire the correct white balance controlling data. For instance, as illustrated in FIG. 2(c), when the window size is too large, even if a small-sized higher brightness portion such as "T" is present, all of the color information data signals within the window containing this high brightness portion will be eliminated from the data acquisition for white balance control. To the contrary, as shown in FIG. 2(d), when the window size is too small, precision in the white balance control is not seriously deteriorated even if the improper picture portion (window) indicated by a symbol "U" is eliminated from the data acquisition for the white balance control. However, there is another problem that since a total number of such windows is considerably greater than that of FIG. 2(c), a lengthy data acquisition for one frame of picture is required.

The present invention has been made in an attempt to solve the above-described conventional problems, and therefore, has an object to provide a white balance adjusting apparatus capable of acquiring correct data for a white balance control by properly eliminating information about a picture portion from which color components cannot be correctly detected such as an excessively high brightness picture portion and/or an excessively low brightness picture portion, while a total number of windows for subdividing one picture into plural picture portions is unchanged.

SUMMARY OF THE INVENTION

To achieve the above-described object, a white balance adjusting apparatus, according to one aspect of the present invention is characterized by comprising:

an image pickup device for imaging an object;

image signal processing means for image processing of an output signal from the image pickup device and for deriving a brightness signal and color information signals;

multiplication factor generating means for generating a variable multiplication factor in response to the brightness signal in such a manner that a high multiplication factor is set when the value of the brightness signal is within a predetermined range, whereas a low multiplication factor is set when the value of the brightness signal becomes excessively low and/or excessively high;

calculating means for calculating said variable multiplication factor derived from said multiplication factor generating means and said color information signal derived from said image signal processing means;

integrating means for integrating output data from said calculating means; and white balance controlling means for performing a white balance control to the image signal based upon integrated data derived from said integrating means.

Preferably, according to another aspect of the present invention, the above-described multiplication factor generating means includes a multiplication factor setting means capable of externally and selectably setting said multiplication factor.

Moreover, preferably, according to a further aspect of the present invention, the above-mentioned multiplication factor generating means includes a multiplication factor changing means by calculating an average value of the brightness signals and for automatically changing the multiplication factor based upon the average value.

In the video image pickup apparatus of the present invention, when the color information signals are integrated so as to acquire the data for the white balance control, the integration of the data is carried out after a predetermined calculation has been executed for the inputted color information signal in response to the value of the inputted brightness signal. As a consequence, since the information about the picture portions from which the color components cannot be correctly detected, such as the excessively high brightness picture portion and/or the excessively low brightness picture portion, are eliminated, it is possible to correctly acquire the white balance controlling data.

The above and other objects and features of the present invention will become apparent from the following detailed description of embodiments thereof taken in conjunction with the accompanying drawings.

BRIEF DESCRIPTION OF THE DRAWINGS

For a better understanding of the present invention, reference is made of the detailed description to be read in conjunction with the accompanying drawings, in which:

FIG. 1 is a schematic block diagram for showing a structure of circuit of the conventional white balance adjusting apparatus;

DETAILED DESCRIPTION OF THE PREFERRED EMBODIMENTS

Figure 2A:
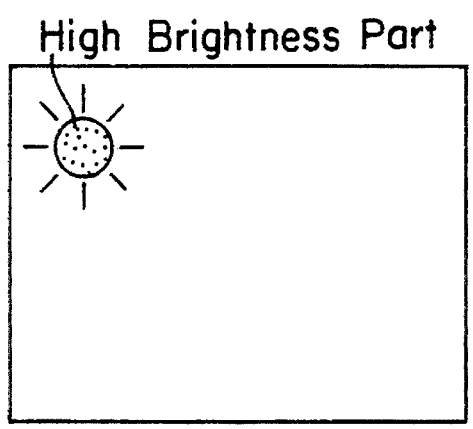
FIG. 2 is an explanatory diagram for explaining operations of the conventional white balance adjusting apparatus shown in FIG. 1.
Figure 2B:
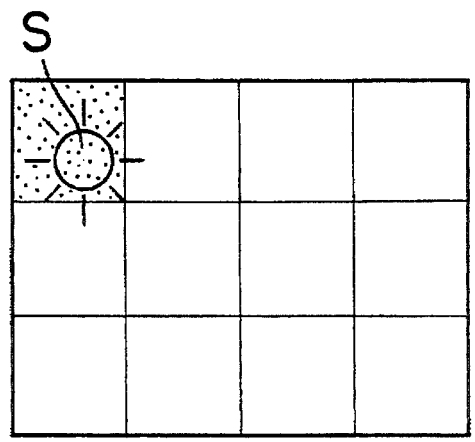
Figure 2C:
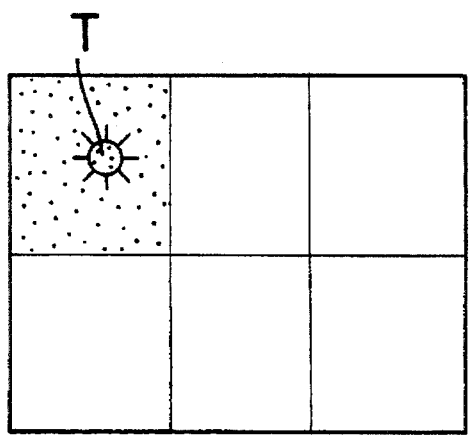
Figure 2D:
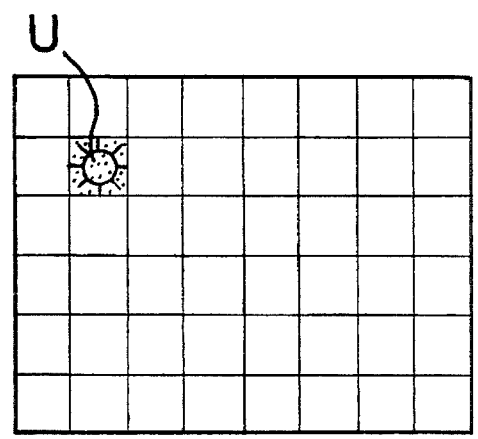

Referring now to the drawings, a white balance adjusting apparatus according to presently preferred embodiments of the present invention will be described in detail.

FIRST EMBODIMENT

In FIG. B, there is shown a structure of circuit of a white balance adjusting apparatus according to a first embodiment of the present invention. It should be noted that the same reference numerals shown in FIG. 1 will be employed as those for indicating the same circuit blocks shown in FIG. 3

Figure 3:
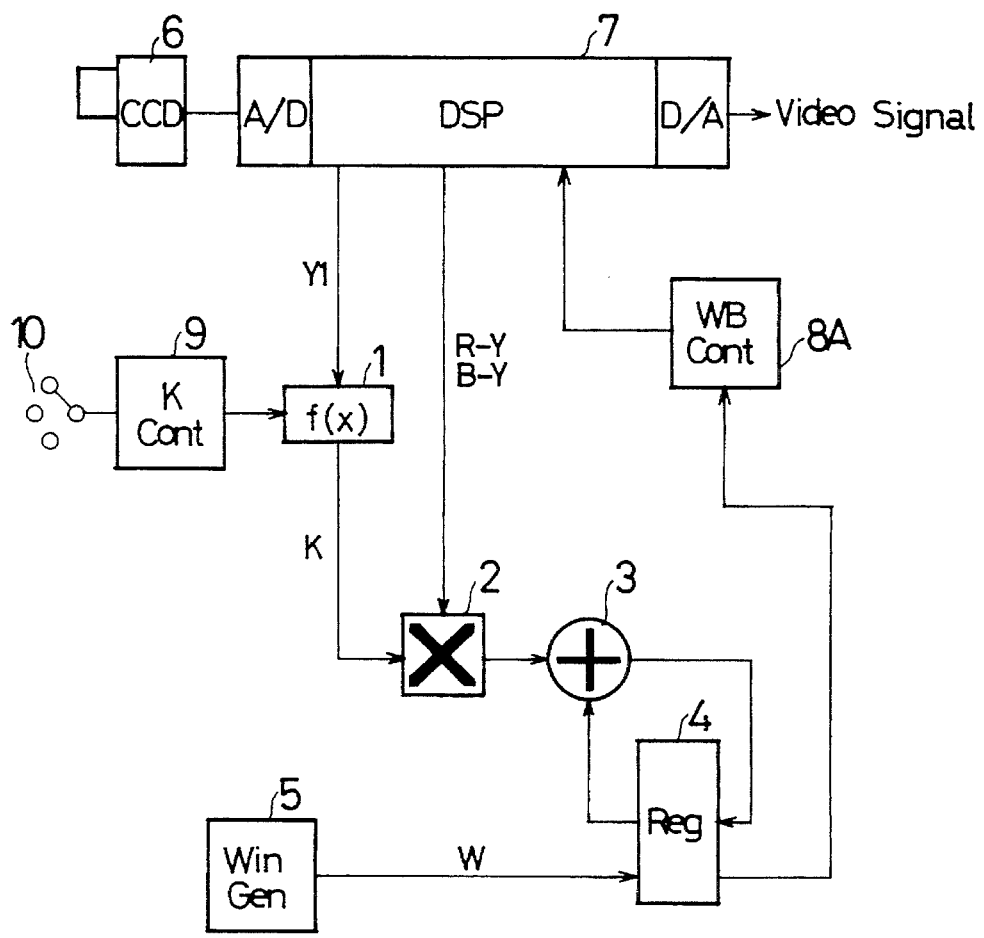
FIG. 3 is a schematic block diagram for representing a structure of circuit of a white balance adjusting apparatus according to a first embodiment of the present invention.

In the circuit of FIG. 3, reference numeral 1 denotes a multiplication factor generator for generating a multiplication factor "K" which is used for varying a value of a color difference signal in accordance with an inputted brightness signal "Y1". Reference numeral 2 represents a multiplier for multiplying the color difference signals (R-Y and B-Y) by the above-described multiplication factor "K". Reference numeral 9 shows a multiplication factor control circuit (simply, referred to "K Cont") for writing the multiplication factor into the multiplication factor generator 1. Reference numeral 10 represents a selector switch for instructing the multiplication factor control circuit 9 to switch the multiplication factors. It should be understood that although only one circuit arrangement constructed of the integration circuits 3 and 4 is shown in FIG. 3, for the sake of simple illustration, two sets of circuit arrangements will be originally prepared for the color difference signals (R-Y and B-Y). The remaining circuits in FIG. 3 are similar to those of the prior art shown in FIG. 1.

Figure 4:
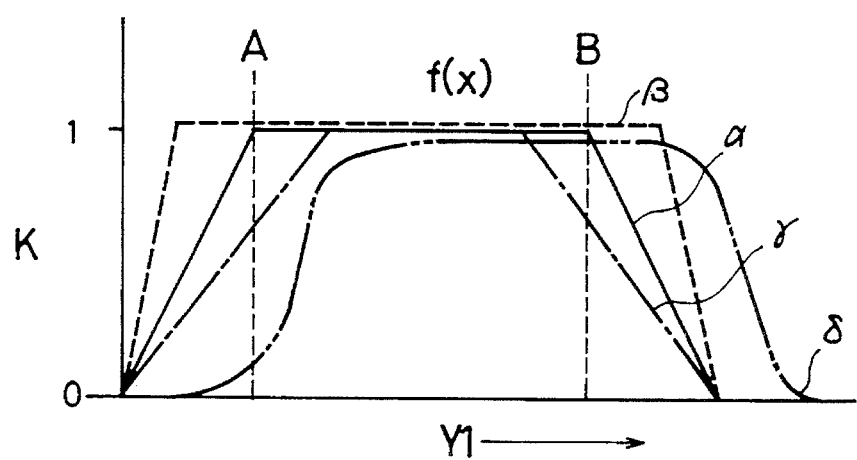
FIG. 4 is a graphic representation for representing the variable conditions of the multiplication factors employed in the first embodiment.

With the above-described circuit arrangement, the signal obtained from the image pickup device 6 is processed by the digital signal processing circuit 7, thereby outputting the video signal. During this signal processing operation, the brightness signal (Y1) and the color difference signals (R-Y and B-Y) are derived as data used to control white balance. In response to the level "Y1" of the brightness signal among the derived signals, the multiplication factor "K" having such a characteristic as indicated by a solid line "α" shown in FIG. 4 is obtained by the multiplication factor generator 1. That is, the multiplication factor "K" becomes "0" when no brightness signal is present. Then, when the value of the brightness signal is increased, the multiplication factor "K" is gradually increased. The multiplication factor "K" becomes "1" at a predetermined point "A". Thereafter, the multiplication factor "K" is constant. When the value of the brightness signal is increased beyond another predetermined point "B", the multiplication factor "K" starts to be decreased from this point "B", and is gradually decreased to "0". As described above, the multiplication factor "K" is a predetermined functional value f(x) with respect to the value of the brightness signal. For instance, both the multiplication factors "K" in relation to the levels of the brightness signals are stored as a memory look-up table in the multiplication Factor control circuit 9. By manually switching the selector switch, the multiplication Factor data within the multiplication Factor generator 1 is rewritten into another Functional value K=f(x) such as dotted line "β", "γ", or "δ" shown in FIG. 4 by the multiplication factor control circuit 9.

The color difference signals which have been simultaneously inputted with the brightness signal, are multiplied by the multiplication factor "K" outputted From the multiplication factor generator 1 in the multiplier 2, and the multiplied color difference signals are inputted into the integration circuit arranged by the adder 3 and the register 4 For integration purposes. When these multiplied color difference data are integrated, the windows are selectively designated in accordance with the window signal "W" produced by the window generating circuit 5, for subdividing a frame of picture into a plurality of windows. Then, the color difference data are integrated with regard to the respective windows.

As described above, while the designated windows are successively selected, the data required For the white balance control are sequentially collected, and thus the collected data are supplied to a white balance control circuit 8A. After the data over one frame of picture have been acquired, the white balance control circuit 8A performs the white balance control of the digital signal processing circuit 7 based upon the acquired data required for the white balance control.

Therefore, according to this first embodiment, as shown in FIG. 4, the value of the multiplication factor "K" concerning the picture portion (window) in which the level of the brightness signal is either execessively low, or excessively high, and which is not proper in controlling white balance, is suppressed to a low multiplication factor. This low multiplication factor is multiplied by the values of the color difference signals. The multiplied resultant data are integrated. Then, since the white balance control is carried out based on the integrated data, the signal data about the picture portion (window) which has either an excessively high brightness value, or an execessively low brightness value, namely whose color components cannot be correctly detected under normal conditions, may be essentially eliminated without using such a specifically small size of the window. Accordingly, the correct data required for the white balance control can be collected.

Also, since the functional value f(x) of the multiplication factor "K" is selectable by means of the selector switch 10, the digital signal processing circuit 7 can perform optimum white balance control according to environments of the objects and desired image qualities of the users.

SECOND EMBODIMENT

Figure 5:
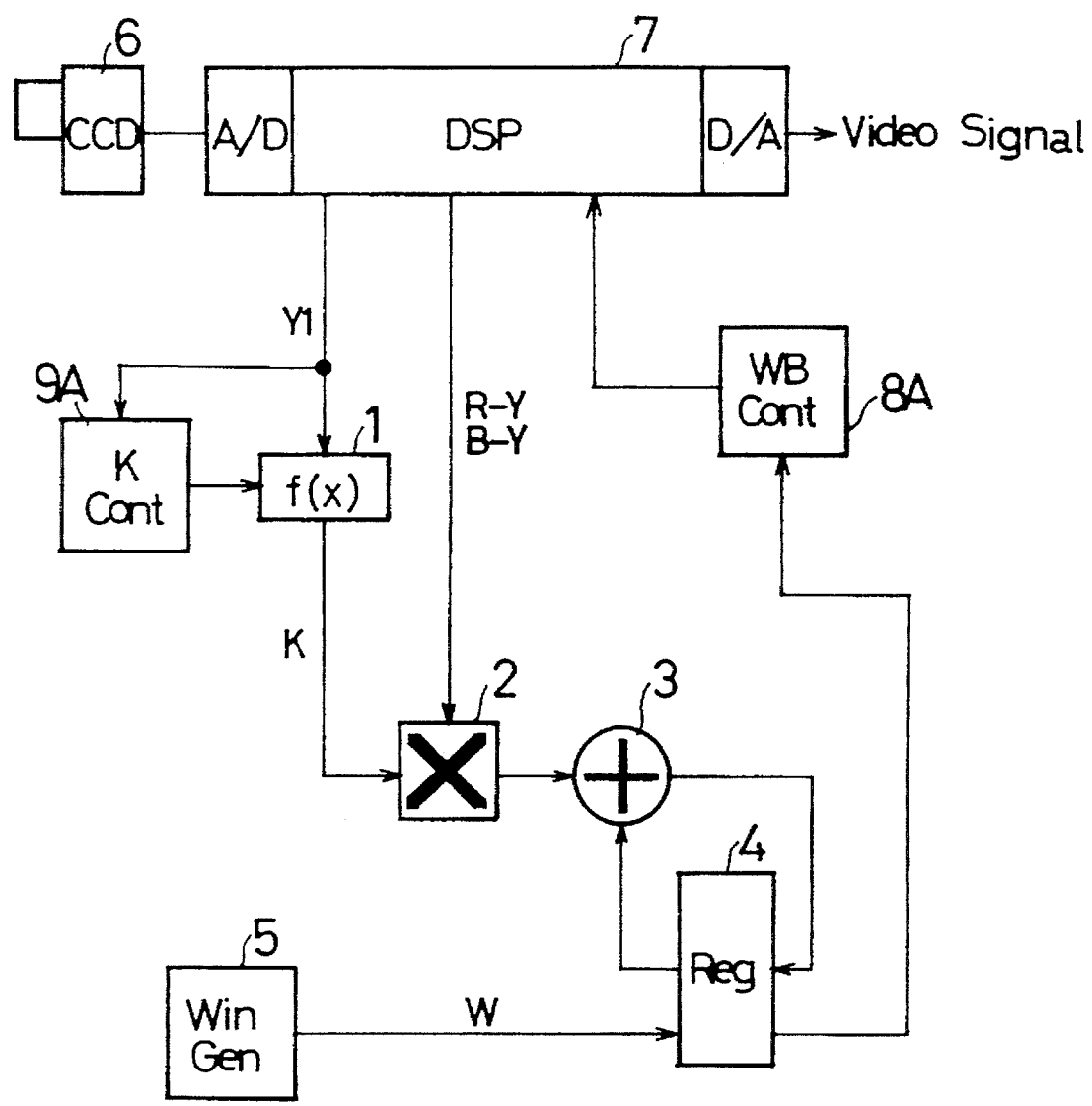
FIG. 5 is a schematic block diagram for indicating a structure of circuit of a white balance adjusting apparatus according to a second embodiment of the present invention.

FIG. 5 schematically represents a circuit arrangement of a white balance adjusting apparatus according to a second embodiment of the present invention. It should be noted that the same reference numerals shown in FIG. 3 will be employed as those for denoting the same, or similar circuit elements indicated in FIG. 5. It should also be noted that although only one circuit arrangement constructed of the integration circuits is provided in FIG. 5, two sets of such integration circuit arrangement should be actually employed in this second embodiment.

With the above-described circuit arrangement, the signal obtained from the image pickup device 6 is processed by the digital signal processing circuit 7, thereby outputting the video signal. During this signal processing operation, the brightness signal (Y1) and the color difference signals (R-Y and B-Y) are derived as data used to control white balance. In response to the level "Y1" of the brightness signal among the derived signals, the multiplication factor "K" having such a characteristic as indicated by a solid line "α" shown in FIG. 4 is obtained by the multiplication factor generator 1. That is, the multiplication factor "K" becomes "0" when no brightness signal is present. Then, when the value of the brightness signal is increased, the multiplication factor "K" is gradually increased. The multiplication factor "K" becomes "1" at a predetermined point "A". Thereafter, the multiplication factor "K" is constant. When the value of the brightness signal is increased beyond another predetermined point "B", the multiplication factor "K" starts to be decreased from this point "B", and is gradually decreased to "0". The above-described circuit arrangement of the second embodiment is the same as that of the first embodiment.

However, this second embodiment has the following different features. That is, the multiplication factor of the multiplication factor generator 1 is automatically rewritten into one of the functional values f(x) as indicated by the dotted lines "α", "β" and "γ" shown in FIG. 4, depending upon the data conditions of the brightness signal (Y1) entered into the multiplication factor control circuit 9A. For instance, the multiplication factor control circuit 9A calculates the average value of the brightness signal (Y1), and then changes the multiplication factor "K" from the solid line"α" to the dot line "γ" of FIG. 4 in case that this brightness signal (Y1) has a low average value. To the contrary, the multiplication factor control circuit 9A changes the multiplication factor "K" from the solid line "α" to the dot line "γ" of FIG. 4 in case that this brightness signal (Y1) has a high average value.

The color difference signals which have been simultaneously inputted with the brightness signal, are multiplied by the multiplication factor "K" outputted from the multiplication factor generator 1 in the multiplier 2, and the multiplied color difference signals are inputted into the integration circuit including the adder 3 and the register 4 for integration purposes. When these multiplied color difference data are integrated, the windows are selectively designated in accordance with the window signal "W" produced from the window generating circuit 5, for subdividing a frame of picture into a plurality of windows. Then, the color difference data are integrated with regard to the respective windows.

As described above, while the designated windows are successively selected, the data required for the white balance control are sequentially collected, and thus the collected data are supplied to a white balance control circuit 8A. After the data about one frame of picture have been acquired, the white balance control circuit 8A performs the white balance control of the digital signal processing circuit 7 based upon the acquired data requited for the white balance control.

In accordance with the second embodiment, since the functional value f(x) of the multiplication factor generator 1 is automatically rewritten into another functional value f(x) of the multiplication factor by the multiplication factor control circuit 9A, depending upon the brightness conditions of the overall frame of picture, there is an advantage that such an optimum white balance control can be carried out without requiring operations of users.

While the present invention has been described in detail, when the inputted color difference signals are integrated, this signal integration is performed after these color difference signals have been processed in accordance with a predetermined calculation, depending upon the value of the entered brightness signal. As a consequence, there are provided such merits that since the information about the picture portion whose color components are not correctly detectable, for instance, the picture portions whose brightness level becomes excessively high, or excessively low, is effectively eliminated, the data required for the white balance control can be correctly acquired without varying the size of the window.

What is claimed is:

1. A white balance adjusting apparatus comprising:

an image pickup device for picking up an object image;

image signal processing means for processing an image signal produced from the image pickup device and for deriving a brightness signal and color information signals;

multiplication factor generating means for generating a variable multiplication factor in response to the brightness signal in such a manner that a high multiplication factor is set when the value of the brightness signal is within a predetermined range, whereas a multiplication factor lower than the above is set when the value of the brightness signal is out of said predetermined range;

computing means for computing between multiplication factor derived from said multiplication factor generating means and said color information signals;

integrating means for integrating output data from said computing means; and white balance controlling means for performing a white balance control to correct said image signal within said image signal processing means based upon the integrated data derived from said integrating means.

2. A white balance adjusting apparatus as claimed in claim 1, wherein said multiplication factor generating means is such that a high value of the multiplication factor is set to a predetermined value when the value of the brightness signal is within said predetermined range, and a value of the multiplication factor is lower than the above and gradually decreased down to 0 (zero) when the value of the brightness signal is out of said predetermined range.

3. A white balance adjusting apparatus as claimed in claim 1 or 2, wherein said multiplication factor generating means includes a multiplication factor generator and a multiplication factor control circuit.

4. A white balance adjusting apparatus as claimed in claim 1, wherein said multiplication factor generating means includes a multiplication factor setting means capable of selectively setting said value of the multiplication factor.

5. A white balance adjusting apparatus as claimed in claim 4, wherein said multiplication factor generating means is a selector switch.

6. A white balance adjusting apparatus as claimed in claim 1, wherein said multiplication factor generating means includes a multiplication factor changing means for computing a mean value of said brightness signal for automatically changing the value of said multiplication factor based upon the obtained mean value.

7. A white balance adjusting apparatus as claimed in claim 1, wherein said computing means are multipliers.

8. A white balance adjusting apparatus as claimed in claim 1, wherein said integrating means includes an adder and an integration register to which an output signal of a window generating circuit is applied.

9. A white balance adjusting apparatus comprising:

an image pickup device for picking up an object image;

image signal processing means for processing an image signal produced from the image pickup device and for deriving a brightness signal and color information signals;

multiplication factor generating means for generating a variable multiplication factor in response to the brightness signal in such a manner that a high multiplication factor is set when the value of the brightness signal is within a predetermined range, whereas a multiplication factor lower than the above is set when the value of the brightness signal is out of said predetermined range;

said multiplication factor generating means including a multiplication factor changing means for computing a mean value of said brightness signal for automatically changing the value of said multiplication factor based upon the obtained mean value;

computing means for computing between multiplication factor derived from said multiplication factor generating means and said color information signals;

integrating means for integrating output data from said computing means; and white balance controlling means for performing a white balance control to correct said image signal within said image signal processing means based upon the integrated data derived from said integrating means.

10. A white balance adjusting apparatus as claimed in claim 9, wherein said multiplication factor generating means is such that a high value of the multiplication factor is set to a predetermined value when the value of the brightness signal is within said predetermined range, and a value of the multiplication factor is lower than the above and gradually decreased down to 0 (zero) when the value of the brightness signal is out of said predetermined range.

11. A white balance adjusting apparatus as claimed in claim 9 or 10, wherein said multiplication factor generating means includes a multiplication factor generator and a multiplication factor control circuit.

12. A white balance adjusting apparatus as claimed in claim 9, wherein said multiplication factor generating means includes a multiplication factor setting means capable of selectively setting said value of the multiplication factor.

13. A white balance adjusting apparatus as claimed in claim 12, wherein said multiplication factor generating means is a selector switch.

14. A white balance adjusting apparatus as claimed in claim 9, wherein said multiplication factor generating means includes a multiplication factor changing means for automatically changing the value of said multiplication factor based upon said brightness signal.

15. A white balance adjusting apparatus as claimed in claim 9, wherein said computing means are multipliers.

16. A white balance adjusting apparatus as claimed in claim 9, wherein said integrating means includes an added and an integration register to which an output signal of a window generating circuit is applied.

* * * * *

UNITED STATES PATENT AND TRADEMARK OFFICE
CERTIFICATE OF CORRECTION

PATENT NO. : 5,485,202
DATED : January 16, 1996
INVENTOR(S) : Osamu Ueda

It is certified that error appears in the above-indentified patent and that said Letters Patent is hereby corrected as shown below:

Col. 1, line 34, after "numeral 3" delete the comma.

Col. 4, line 51, change "Factor" to -- factor --.

Col. 4, line 52, change "Factor" to -- factor --.

Col. 4, line 52, change "Functional" to -- functional --.

Col. 4, line 57, change "From" to --from --.

Col. 4, line 61, change "For" to -- for --.

Col. 6, line 9, change "$\gamma$" to --$\beta$ --.

Col. 8, line 50, change "added" to -- adder --.

Signed and Sealed this

Thirteenth Day of August, 1996

Attest:

BRUCE LEHMAN

*Attesting Officer*     *Commissioner of Patents and Trademarks*